United States Patent
Hirata et al.

(10) Patent No.: US 9,796,139 B2
(45) Date of Patent: Oct. 24, 2017

(54) THREE-DIMENSIONAL SHAPING COMPOSITION, METHOD FOR PRODUCING THREE-DIMENSIONALLY SHAPED ARTICLE, AND THREE-DIMENSIONALLY SHAPED ARTICLE

(71) Applicant: Seiko Epson Corporation, Tokyo (JP)

(72) Inventors: Koki Hirata, Matsumoto (JP); Shinichi Kato, Matsumoto (JP); Hiroshi Fukumoto, Shiojiri (JP); Chigusa Sato, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/886,357

(22) Filed: Oct. 19, 2015

(65) Prior Publication Data

US 2016/0108259 A1    Apr. 21, 2016

(30) Foreign Application Priority Data

Oct. 20, 2014    (JP) ................. 2014-213613

(51) Int. Cl.

| | | |
|---|---|---|
| *C09D 4/00* | (2006.01) | |
| *C09D 5/00* | (2006.01) | |
| *B29C 67/00* | (2017.01) | |
| *B33Y 80/00* | (2015.01) | |
| *B33Y 10/00* | (2015.01) | |
| *B33Y 70/00* | (2015.01) | |
| *C09D 11/101* | (2014.01) | |
| *C09D 11/38* | (2014.01) | |
| *C08K 9/00* | (2006.01) | |
| *C08K 9/04* | (2006.01) | |
| *B29K 33/00* | (2006.01) | |
| *B29K 105/00* | (2006.01) | |

(52) U.S. Cl.
CPC .......... *B29C 67/0081* (2013.01); *B33Y 10/00* (2014.12); *B33Y 70/00* (2014.12); *B33Y 80/00* (2014.12); *C09D 4/00* (2013.01); *C09D 11/101* (2013.01); *C09D 11/38* (2013.01); *B29K 2033/08* (2013.01); *B29K 2105/251* (2013.01); *B29K 2995/0092* (2013.01); *C08K 9/00* (2013.01); *C08K 9/04* (2013.01)

(58) Field of Classification Search
CPC ... C09D 7/12; C09D 5/00; C09D 4/00; C09D 7/1225; B29C 67/00; B29C 67/0081
USPC .......................................... 524/425; 428/413
See application file for complete search history.

(56) References Cited

U.S. PATENT DOCUMENTS

| | | |
|---|---|---|
| 5,340,656 A | 8/1994 | Sachs et al. |
| 2005/0079086 A1 | 4/2005 | Farr et al. |
| 2012/0302676 A1* | 11/2012 | Oya ........................ C08J 5/18 524/89 |

FOREIGN PATENT DOCUMENTS

| | | |
|---|---|---|
| JP | 06-218712 A | 8/1994 |
| JP | 2005-120475 A | 5/2005 |
| JP | 2011-246574 A | 12/2011 |

* cited by examiner

*Primary Examiner* — Deve E Valdez

(74) *Attorney, Agent, or Firm* — Harness, Dickey & Pierce, P.L.C.

(57) ABSTRACT

A three-dimensional shaping composition of this invention is a three-dimensional shaping composition which is used for producing a three-dimensionally shaped article by laminating layers and contains particles having a hydrophilic surface and water-soluble monomers having a hydroxyl group. The water-soluble monomer is preferably at least one selected from the group consisting of 4-hydroxybutyl acrylate, 2-hydroxybutyl acrylate, 2-hydroxypropyl acrylate, 2-hydroxyethyl methacrylate, 2-hydroxypropyl methacrylate, and phenol epoxy acrylate.

5 Claims, 4 Drawing Sheets

THREE-DIMENSIONAL SHAPING COMPOSITION, METHOD FOR PRODUCING THREE-DIMENSIONALLY SHAPED ARTICLE, AND THREE-DIMENSIONALLY SHAPED ARTICLE

BACKGROUND

1. Technical Field

The present invention relates to a three-dimensional shaping composition, a method for producing a three-dimensionally shaped article, and a three-dimensionally shaped article.

2. Related Art

A technique of shaping a three-dimensional object while solidifying powder with a bonding liquid is known (for example, JP-A-6-218712). According to this technique, a three-dimensional object is shaped by repeating the following operations. First, powder is thinly spread with a uniform thickness to form a powder layer, and then a bonding liquid is discharged to a desired portion of the powder layer to bond powder. As a result, in the powder layer, only the portion to which the bonding liquid is discharged is bonded, so that a thin plate member (hereinafter referred to as a "cross-sectional member") is formed. Thereafter, a powder layer is further thinly formed on the powder layer, and then a bonding liquid (curable ink) is discharged to a desired portion. As a result, a new cross-sectional member is formed also on the portion to which the bonding liquid is discharged of the newly formed powder layer. In this operation, since the bonding liquid discharged onto the powder layer penetrates to reach the previously formed cross-sectional member, the newly formed cross-sectional member is bonded also to the previously formed cross-sectional member. By repeating such operations to successively laminate a thin plate cross-sectional member, a three-dimensional object can be shaped.

According to such a three-dimensional shaping technique, since a three-dimensional shaped article can be immediately shaped by bonding powder insofar as there are three-dimensional shape data of an object to be shaped and there is no necessity of creating a die before shaping and the like, a three-dimensional object can be quickly and inexpensively shaped. Moreover, the three-dimensional shaped article is shaped by successively laminating a thin plate cross-sectional member, and therefore, even in the case of a complicated object having an internal structure, for example, the three-dimensional shaped article can be shaped as an integrally shaped article without being divided into a plurality of parts.

However, in the former technique, the bonding strength obtained by the bonding liquid was not able to be made sufficiently high, and thus the strength of the three-dimensionally shaped article was not able to be made sufficiently high.

SUMMARY

An advantage of some aspects of the invention is to provide a three-dimensional shaping composition and a method for producing a three-dimensionally shaped article capable of efficiently producing a three-dimensionally shaped article excellent in mechanical strength and to provide a three-dimensionally shaped article excellent in mechanical strength.

Such an object is achieved by the present invention described below.

A three-dimensional shaping composition of the present invention is a three-dimensional shaping composition which is used for producing a three-dimensionally shaped article by laminating layers and contains particles having a hydrophilic surface and water-soluble monomers having a hydroxyl group.

Thus, a three-dimensionally shaped article excellent in mechanical strength can be efficiently produced.

In the three-dimensional shaping composition of the present invention, the water-soluble monomer is preferably a radically polymerizable monomer or a cationically polymerizable monomer.

Thus, a layer having excellent mechanical strength and high thickness uniformity can be efficiently produced.

In the three-dimensional shaping composition of the present invention, the water-soluble monomer is preferably at least one selected from the group consisting of 4-hydroxybutyl acrylate, 2-hydroxybutyl acrylate, 2-hydroxypropyl acrylate, 2-hydroxyethyl methacrylate, 2-hydroxypropyl methacrylate, and phenol epoxy acrylate.

Thus, the fluidity of the three-dimensional shaping composition can be made higher.

It is preferable for the three-dimensional shaping composition of the present invention to further contain an aqueous solvent.

Thus, the fluidity of the three-dimensional shaping composition can be made much higher.

In the three-dimensional shaping composition of the present invention, the particles preferably have at least one functional group selected from the group consisting of a hydroxyl group, a carboxyl group, and an amino group on the surface.

Thus, the mechanical strength of the three-dimensionally shaped article to be finally obtained can be made particularly excellent.

In the three-dimensional shaping composition of the present invention, the constituent material of the particles is preferably at least one selected from the group consisting of silica, calcium carbonate, alumina, and titanium oxide.

Thus, a layer having high thickness uniformity can be more easily formed.

A method for producing a three-dimensionally shaped article of the present invention is a three-dimensionally shaped article producing method for producing a three-dimensionally shaped article by laminating layers, and the method includes a layer formation process of forming the layers using a three-dimensional shaping composition containing particles having a hydrophilic surface and water-soluble monomers having a hydroxyl group, and an ink discharge process of discharging an ink containing a polymerization initiator to the layers.

Thus, a method for producing a three-dimensionally shaped article capable of efficiently producing a three-dimensionally shaped article excellent in mechanical strength can be provided.

According to the method for producing a three-dimensionally shaped article of the present invention, it is preferable to further have a removal process of removing the particles which are not bonded after repeatedly performing the layer formation process and the discharge process.

Thus, a three-dimensionally shaped article excellent in mechanical strength can be more efficiently produced.

A three-dimensionally shaped article of the present invention is produced by the method for producing a three-dimensionally shaped article of the present invention.

Thus, a three-dimensionally shaped article excellent in mechanical strength can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1A:
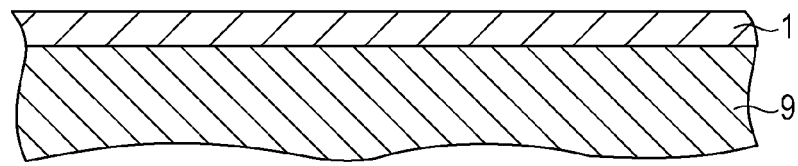
FIGS. 1A to 1H are schematic views illustrating each process about a preferable embodiment of a method for producing a three-dimensionally shaped article of the present invention.

Hereinafter, preferable embodiments of the present invention are described in detail with reference to the accompanying drawings.

1. Three-Dimensional Shaping Composition

First, a three-dimensional shaping composition of the present invention is described in detail.

The three-dimensional shaping composition contains a plurality of particles 11 having a hydrophilic surface and water-soluble monomers 12 having a hydroxyl group.

The present invention has a feature in containing particles having a hydrophilic surface and water-soluble monomers having a hydroxyl group.

Due to the feature, the particles can be firmly bonded in the production of a three-dimensionally shaped article described later. As a result, a three-dimensionally shaped article excellent in mechanical strength can be efficiently produced.

Hereinafter, each component is described in detail.
Particles

With respect to the particles 11, the surface has hydrophilicity.

The hydrophilicity of the surface of the particles 11 may be the revealed hydrophilicity of the constituent material itself of the particles 11 or may be given by surface treatment.

In particular, when the particle 11 has at least one functional group selected from the group consisting of a hydroxyl group, a carboxyl group, and an amino group on the surface, a hydrogen bond is formed between the hydroxyl group of the water-soluble monomer 12 and the functional group on the surface of the particle 11, so that the water-soluble monomer 12 having a hydroxyl group firmly adheres to the surface of the particle 11. As a result, the mechanical strength of the three-dimensionally shaped article 100 to be finally obtained can be made higher.

The functional group described above can be introduced by surface treating the particle surface using a silane coupling agent, for example.

Examples of the silane coupling agent include, for example, bis(2-hydroxyethyl)-3-aminopropyltriethoxysilane, 3-aminopropyltriethoxysilane, alkylalkoxysilane having an alkyl group substituted by a carboxyl group, 3-trimethoxy silyl propyl succinic acid anhydride, and the like.

Examples of the constituent material of the particles 11 include, for example, inorganic materials, organic materials, complexes thereof, and the like.

Examples of the inorganic materials constituting the particles 11 include, for example, various metals, metallic compounds, and the like. Examples of the metallic compounds include, for example, various metal oxides, such as silica, alumina, titanium oxide, zinc oxide, zircon oxide, tin oxide, magnesium oxide, and potassium titanate; various metal hydroxides, such as magnesium hydroxide, aluminum hydroxide, and calcium hydroxide; various metal nitrides, such as silicon nitride, titanium nitride, and aluminum nitride; various metal carbides, such as silicon carbide and titanium carbide; various metal sulfides, such as zinc sulfide; carbonates of various metals, such as calcium carbonate and magnesium carbonate; sulfates of various metals, such as calcium sulfate and magnesium sulfate; silicates of various metals, such as calcium silicate and magnesium silicate; phosphates of various metals, such as calcium phosphate; borates of various metals, such as aluminum borate and magnesium borate, complex compounds thereof, and the like.

As the organic materials constituting the particles 11, synthetic resin, natural polymers, and the like are mentioned, for example. More specifically, polyethylene resin; polypropylene; polyethylene oxide; polypropylene oxide and polyethylene imine; polystyrene; polyurethane; polyurea; polyester; silicone resin; acrylic silicone resin; polymers containing (meth)acrylic acid esters, such as polymethyl methacrylate, as a constituent monomer; crosspolymers (ethylene acrylate copolymerization resin and the like) containing (meth)acrylic acid esters, such as a methyl methacrylate crosspolymer, as a constituent material; polyamide resin, such as nylon 12, nylon 6, and copolymer nylon; polyimide; carboxy methyl cellulose; gelatin; starch; kitchen; chitosan; and the like are mentioned.

Among the above, the particle 11 is preferably one containing inorganic materials, more preferably one containing metal oxides, and still more preferably one containing silica. Thus, the properties, such as mechanical strength and lightfastness, of the three-dimensionally shaped article can be made more excellent. Moreover, since silica is also excellent in fluidity, the particles are advantageous in the formation of a layer having higher thickness uniformity and also the productivity and the dimensional accuracy of a three-dimensionally shaped article 100 can be made particularly excellent. When the particles 11 contain silica, scattering of light by the particles 11 on the surface of the three-dimensionally shaped article to be produced can be more effectively prevented. Silica generally has a hydroxyl group on the surface, and thus silica can be preferably used.

As silica, commercially available items can be preferably used.

The average particle diameter of the particles 11 is not particularly limited and is preferably 1 μm or more and 25 μm or less and more preferably 1 μm or more and 15 μm or less. Thus, the mechanical strength of the three-dimensionally shaped article 100 can be made particularly excellent and also the generation of undesired irregularities in the three-dimensionally shaped article 100 to be produced is more effectively prevented and the dimensional accuracy of the three-dimensionally shaped article 100 can be made particularly excellent. Moreover, the fluidity of three-dimensional shaping powder and the fluidity of a three-dimensional shaping composition containing the three-dimensional shaping powder can be made particularly excellent and the productivity of the three-dimensionally shaped article can be made particularly excellent. In the present invention, the average particle diameter refers to an average particle diameter on a volume basis and can be determined by, for example, adding a sample to methanol, and then measuring a dispersion liquid obtained by being dispersed with an ultrasonic disperser for 3 minutes using a 50 μm aperture with a Coulter counter method particle size distribution meter (TA-II type manufactured by COULTER ELECTRONICS INS).

The Dmax of the particles 11 is preferably 3 μm or more and 40 μm or less and more preferably 5 μm or more and 30 μm or less. Thus, the mechanical strength of the three-dimensionally shaped article 100 can be made particularly excellent and also the generation of undesired irregularities in the three-dimensionally shaped article 100 to be produced is more effectively prevented and the dimensional accuracy of the three-dimensionally shaped article 100 can be made particularly excellent. Moreover, the fluidity of three-dimensional shaping powder and the fluidity of the three-dimensional shaping composition containing the three-dimensional shaping powder can be made particularly excellent and the productivity of the three-dimensionally shaped article 100 can be made particularly excellent. Moreover, scattering of light by the particles 11 on the surface of the three-dimensionally shaped article 100 to be produced can be more effectively prevented.

The particles 11 may have any shape and preferably have a spherical shape. Thus, the fluidity of three-dimensional shaping powder and the fluidity of the three-dimensional shaping composition containing the three-dimensional shaping powder can be made particularly excellent and the productivity of the three-dimensionally shaped article 100 can be made particularly excellent and also the generation of undesired irregularities in the three-dimensionally shaped article 100 to be produced is more effectively prevented and the dimensional accuracy of the three-dimensionally shaped article 100 can be made particularly excellent. Moreover, scattering of light by the particles 11 on the surface of the three-dimensionally shaped article 100 to be produced can be more effectively prevented.

The content of the three-dimensional shaping powder in the three-dimensional shaping composition is preferably 10 mass % or more and 90 mass % or less and more preferably 15 mass % or more and 58 mass % or less.

The particles 11 may be porous and the bulk density is suitably in the range of 0.1 g/cm$^3$ or more and 1.0 g/cm$^3$ or less and porous powder having a bulk density in the range of 0.15 g/cm$^3$ or more and 0.5 g/cm$^3$ or less is more preferable. Thus, the fluidity of the three-dimensional shaping composition can be made particularly excellent and also the mechanical strength of the three-dimensionally shaped article 100 to be finally obtained can be made sufficiently excellent.

Water-Soluble Monomer

The three-dimensional shaping composition contains water-soluble monomers having a hydroxyl group.

Due to the fact that the water-soluble monomers having a hydroxyl group are contained, the particles in the three-dimensionally shaped article can be firmly bonded. As a result, the mechanical strength of the three-dimensionally shaped article 100 to be finally obtained can be made particularly excellent.

Moreover, due to the fact that the three-dimensional shaping composition contains the water-soluble monomers having a hydroxyl group, the fluidity of the three-dimensional shaping composition can be made good even when a solvent is not added into the three-dimensional shaping composition. As a result, in the production of the three-dimensionally shaped article described later, the dimensional accuracy of a layer to be formed can be made higher.

Even in the case of water-soluble monomers having a hydroxyl group with high viscosity which does not allow addition into ink, the water soluble monomers can be blended in the three-dimensional shaping composition.

The water-soluble monomer having a hydroxyl group is preferably a radically polymerizable monomer or a cationically polymerizable monomer. Thus, a layer having excellent mechanical strength and high thickness uniformity can be efficiently produced.

The water-soluble monomer having a hydroxyl group is not particularly limited and it is preferable to use at least one selected from the group consisting of 4-hydroxybutyl acrylate, 2-hydroxybutyl acrylate, 2-hydroxypropyl acrylate, 2-hydroxyethyl methacrylate, 2-hydroxypropyl methacrylate, and phenol epoxy acrylate. Thus, the penetration properties into a layer 1 of an ink 2 can be made much higher. As a result, the mechanical strength of the three-dimensionally shaped article 100 to be finally obtained can be made particularly excellent.

The content of the water-soluble monomers having a hydroxyl group in the three-dimensional shaping composition is preferably 5 mass % or more and 90 mass % or less and more preferably 7 mass % or more and 80 mass % or less. Thus, the mechanical strength of the three-dimensionally shaped article 100 to be finally obtained can be made particularly excellent.

Aqueous Solvent

The three-dimensional shaping composition may contain an aqueous solvent in addition to the particles 11 and the water-soluble monomers 12 having a hydroxyl group described above. Thus, the fluidity of the three-dimensional shaping composition can be made particularly excellent and the productivity of the three-dimensionally shaped article 100 can be made particularly excellent.

The aqueous solvent constituting the three-dimensional shaping composition is one containing water and/or liquid excellent in compatibility with water and is preferably one mainly containing water and particularly one in which the water content is 70 wt % or more is preferable and one in which the water content is 90 wt % or more is more preferable. Thus, water-soluble monomers 12 having a hydroxyl group can be more certainly dissolved, and the fluidity of the three-dimensional shaping composition and the composition uniformity of the layers 1 formed using the three-dimensional shaping composition can be made particularly excellent. Water is easily removed after the formation of the layer 1 and also water is hard to adversely affect even when water remains in the three-dimensionally shaped article 100. Moreover, water is advantageous also from the viewpoints of the safety to human bodies, environmental problems, and the like.

When the aqueous solvent is contained in the three-dimensional shaping composition, the content of the aqueous solvent is preferably 5 mass % or more and 75 mass % or less and more preferably 20 mass % or more and 70 mass % or less. Thus, the effects obtained due to the fact that the aqueous solvent described above is contained are more noticeably demonstrated and also the aqueous solvent can be easily removed in a short time in the process of producing the three-dimensionally shaped article 100. Therefore, the aqueous solvent is advantageous from the viewpoint of an improvement of the productivity of the three-dimensionally shaped article 100.

In particular, when the three-dimensional shaping composition contains water as the aqueous solvent, the water content in the three-dimensional shaping composition is preferably 10 mass % or more and 73 mass % or less and more preferably 20 mass % or more and 70 mass % or less. Thus, the effects described above are more noticeably demonstrated. Due to the fact that the aqueous solvent is removed after the formation of the layer 1, the ink can easily form voids, through which the ink can penetrate into the layer 1. Due to the fact that the ink penetrates into the voids, the particles can be firmly bonded.

The aqueous solvent may not be contained in the three-dimensional shaping composition.

Other Components

The three-dimensional shaping composition may contain components other than the components described above. Examples of such components include, for example, water-soluble resin; penetration accelerators; wetting agents (moisturizers); fixing agents; antifungal agents; antiseptics; antioxidants; ultraviolet absorbers; chelating agents; pH adjusters; and the like.

2. Method for Producing Three-Dimensionally Shaped Article

Next, a method for producing a three-dimensionally shaped article of the present invention is described.

FIGS. 1A to 1H are schematic views illustrating each process about a preferable embodiment of the method for producing a three-dimensionally shaped article of the present invention. FIG. 2 is a cross-sectional view schematically illustrating the state of a particle and a water-soluble monomer having a hydroxyl group.

As illustrated in FIGS. 1A to 1H, the production method of this embodiment includes a layer formation process (FIGS. 1A and 1D) of forming the layer 1 using the three-dimensional shaping composition, an ink discharge process (FIGS. 1B and 1E) of giving the ink 2 containing a polymerization initiator to the layer 1 by an ink jet method, a curing process (FIGS. 1C and 1F) of, when a curable component is contained in the water-soluble monomers having a hydroxyl group and the ink 2, the curable component by radical or cation generated by giving energy to the polymerization initiator contained in the ink 2 given to the layer 1, and then, after successively repeating these processes, an unbonded particle removal process (FIG. 1H) of removing unbonded particles among the particles 11 constituting each layer 1.

Layer Formation Process

Figure 2:
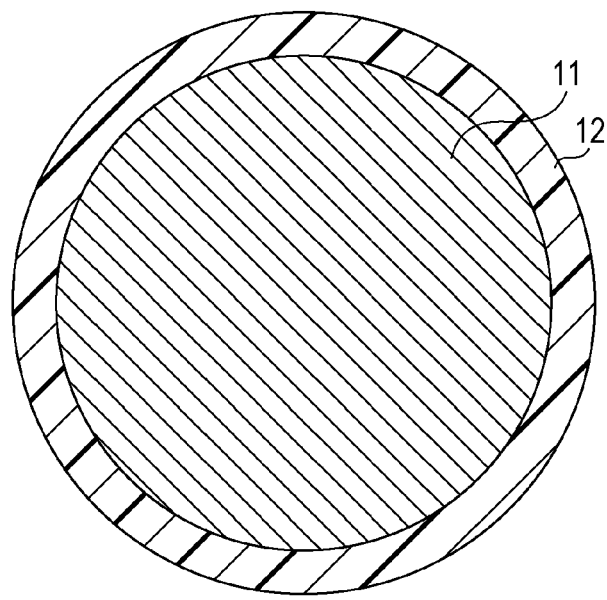
FIG. 2 is a cross-sectional view schematically illustrating the state of a particle and a water-soluble monomer having a hydroxyl group.

First, on a support (stage) 9, the layer 1 is formed using the three-dimensional shaping composition (FIG. 1A).

The support 9 has a flat surface (portion to which the three-dimensional shaping composition is given). Thus, the layer 1 having high thickness uniformity can be easily and certainly formed.

The support 9 is preferably one containing materials with high strength. Examples of the constituent materials of the support 9 include, for example, various metal materials, such as stainless steel.

The surface (portion to which the three-dimensional shaping composition is given) of the support 9 may be surface treated. Thus, the constituent materials of the three-dimensional shaping composition and the constituent materials of the ink 2 can be more effectively prevented from adhering to the support 9, the durability of the support 9 can be made particularly excellent, and the three-dimensional shaped article 100 can be stably produced over a long period of time, for example. Examples of materials to be used for the surface treatment of the surface of the support 9 include, for example, fluororesin, such as polytetrafluoroethylene.

The three-dimensional shaping composition contains the plurality of particles 11 having a hydrophilic surface and the water-soluble monomers 12 having a hydroxyl group as described above.

Due to the fact that the water-soluble monomers 12 are contained, the fluidity of the three-dimensional shaping composition can be made particularly excellent and the productivity of the three-dimensionally shaped article 100 can be made particularly excellent.

Due to the fact that the water-soluble monomers 12 having a hydroxyl group are contained, undesired scattering of the particles and the like can be effectively prevented. Thus, the safety of operators and an improvement of the dimensional accuracy of the three-dimensionally shaped article 100 to be produced can be achieved.

Since the particle 11 has a hydrophilic surface, the affinity with the water-soluble monomer 12 having a hydroxyl group is high. Therefore, the water-soluble monomer 12 having a hydroxyl group covers the surrounding of the particle 11 as illustrated in FIG. 2 in the three-dimensional shaping composition. Since the particles 11 and the water-soluble monomers 12 having a hydroxyl group have high affinity, the adhesiveness of the particles 11 and the water-soluble monomers 12 having a hydroxyl group is high. By polymerization of the water-soluble monomers having a hydroxyl group in the state, the particles 11 can be firmly bonded to each other. As a result, the mechanical strength of the three-dimensionally shaped article 100 to be finally obtained can be made particularly excellent.

The entire surface of the particle 11 may not be completely covered with the water-soluble monomer 12 having a hydroxyl group.

This process can be performed by the use of methods, such as a squeegee method, a screen printing method, a doctor blade method, and a spin coating method, for example.

The thickness of the layer 1 formed in this process is not particularly limited and is preferably 30 µm or more and 500 µm or less and more preferably 70 µm or more and 150 µm or less. Thus, the productivity of the three-dimensionally shaped article 100 can be made sufficiently excellent and also the generation of undesired irregularities and the like in the three-dimensionally shaped article 100 to be produced can be more effectively prevented and the dimensional accuracy of the three-dimensionally shaped article 100 can be made particularly excellent.

Ink Discharge Process

Figure 1B:
Figure 1B:
Figure 1B:
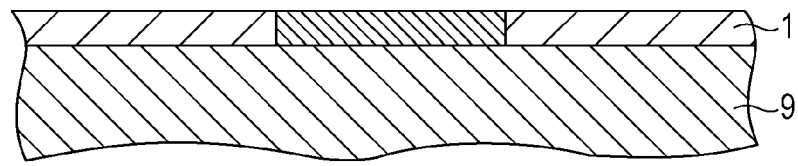

Thereafter, the ink 2 containing a polymerization initiator is discharged to the layer 1 by an ink jet method (FIG. 1B).

In this process, the ink 2 is selectively given only to a portion corresponding to a substantial portion (substantial site) of the three-dimensionally shaped article 100 of the layer 1.

Thus, when a curable component is contained in the water-soluble monomers having a hydroxyl group constituting the layer 1 and the ink 2, the curable component can be cured, so that the particles 11 can be firmly bonded to each other. As a result, the mechanical strength of the three-dimensionally shaped article 100 to be finally obtained can be made particularly excellent.

In this process, the ink 2 is given by an ink jet method, and therefore, even when the giving pattern of the ink 2 is a fine shape, the ink 2 can be given with sufficient reproducibility.

The ink 2 is described in more detail later.

Curing Process

Figure 1C:
Figure 1C:
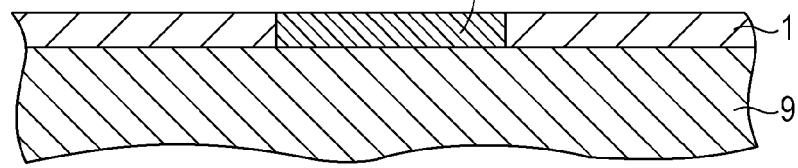

Next, the water-soluble monomers 12 having a hydroxyl group contained in the layer 1 (the water-soluble monomers 12 having a hydroxyl group and the curable component when the curable component is contained in the ink 2) are cured to form a cured portion 3 (FIG. 1C). Thus, the bonding strength of the particles 11 can be made particularly excellent, and as a result the mechanical strength of the three-dimensionally shaped article 100 to be finally obtained can be made particularly excellent.

The ink discharge process and the curing process may be concurrently performed. More specifically, before the entire pattern of the entire one layer 1 is formed, the curing reaction may be successively promoted from the portions to which the ink 2 is given.

Figure 1D:
Figure 1D:
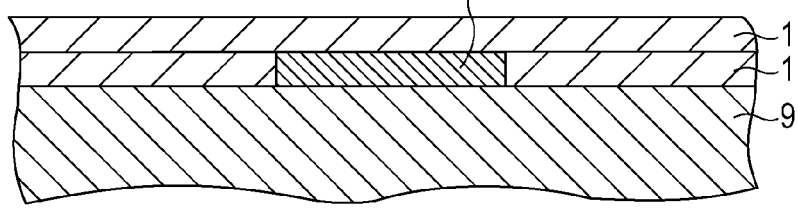
Figure 1E:
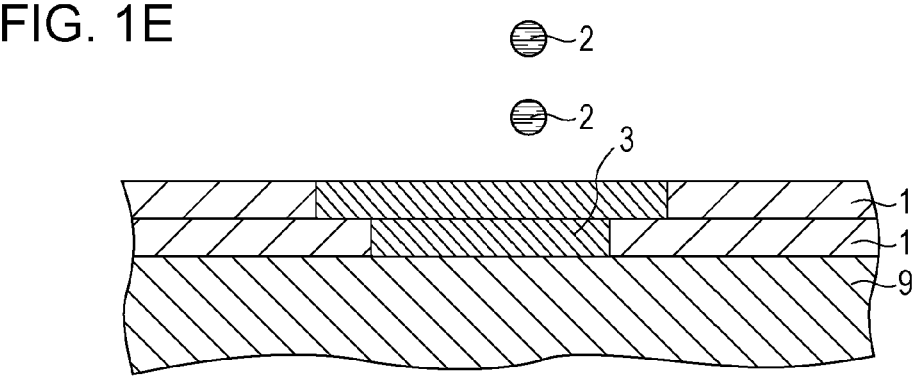
Figure 1F:
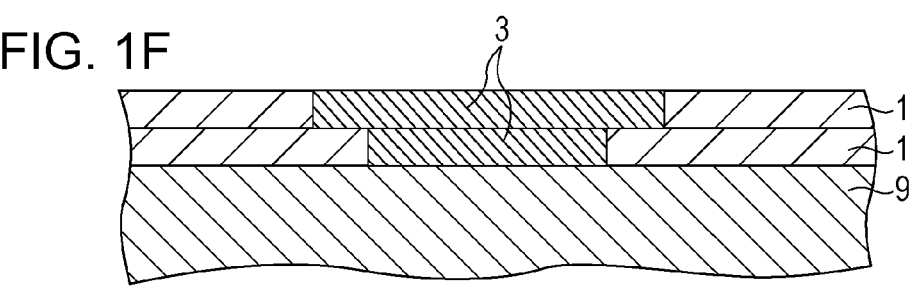
Figure 1G:
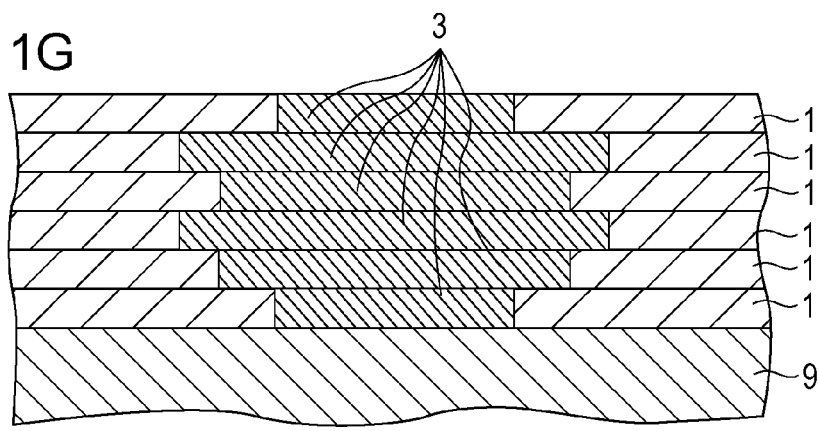
Figure 1H:
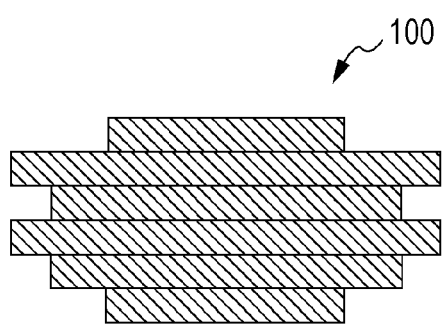

Thereafter, the series of the above-described processes are repeatedly performed (FIGS. 1D, 1E, and 1F). Thus, the particles 11 of the portions to which the ink 2 is given of each layer 1 described above are bonded, so that the three-dimensionally shaped article 100 as a laminate in which two or more of the layers 1 in such a state are laminated is obtained (FIG. 1G).

The ink 2 given to the layer 1 in the second and subsequent ink discharge processes (FIG. 1E) is utilized for bonding the particles 11 constituting the layers 1 and also the given ink 2 partially penetrates into the layer 1 below the previously formed layer 1. Therefore, the ink 2 is utilized not only for bonding the particles 11 within each layer 1 but for bonding the particles 11 between adjacent layers. As a result, the three-dimensionally shaped article 100 to be finally obtained is excellent in the mechanical strength as the entire.

Unbonded-Particle Removal Process

Then, after repeatedly performing the series of the above-described processes, an unbonded-particle removal process (FIG. 1H) of removing particles which are not bonded by the curable component (unbonded particle), when the curable component is contained in the water-soluble monomers having a hydroxyl group and the ink 2, among the particles 11 constituting each layer 1, is performed as a post-treatment process. Thus, the three-dimensionally shaped article 100 is taken out.

Specific methods of this process include, for example, a method of brushing off the unbonded particles with a brush or the like, a method of removing the unbonded particles by suction, a method of spraying gas, such as air, a method of giving liquid, such as water (for example, a method of dipping the laminate obtained as described above in liquid, a method of spraying liquid, and the like), a method of giving vibration, such as ultrasonic vibration, and the like. Two or more methods selected from the methods above may be performed in combination. More specifically, a method of spraying gas, such as air, and then dipping the laminate in liquid, such as water, a method of giving ultrasonic vibration in the state where the laminate is dipped in liquid, such as water, and the like are mentioned. Among the above, it is preferable to adopt the method of giving liquid containing water to the laminate obtained as described above (particularly the method of dipping the laminate in liquid containing water). Thus, particles which are not bonded by the cured water-soluble monomers 12 having a hydroxyl group (the water-soluble monomers having a hydroxyl group and/or the curable component) among the particles 11 constituting each layer 1 are also temporarily fixed by the water-soluble monomers 12 having a hydroxyl group but the water-soluble monomers 12 having a hydroxyl group can be dissolved by the use of liquid containing water to release the temporary fixation, so that the unbonded particles can be more easily and more certainly removed from the three-dimensionally shaped article 100. Moreover, the three-dimensionally shaped article 100 can be more certainly prevented from the generation of defects, such as flaws, when removing the unbonded particles. Moreover, by adopting such a method, cleaning of the three-dimensionally shaped article 100 can also be performed.

Before the unbonded-particle removal process, annealing treatment (heat treatment) may be performed to the laminate of the layers 1. Thus, the curable component contained in the ink 2 and the water-soluble monomers 12 having a hydroxyl group can be more certainly cured, so that the mechanical strength of the three-dimensionally shaped article 100 to be obtained can be made much higher.

3. Ink

Next, the ink to be used for producing the three-dimensionally shaped article of the present invention is described in detail. The ink contains a polymerization initiator which polymerizes the water-soluble monomers 12 having a hydroxyl group.

The ink may have an ink configuration containing a polymerization initiator and a solvent and the ink may have a configuration of containing a polymerization initiator and a curable component.

Polymerization Initiator

The polymerization initiator is a component which polymerizes the water-soluble monomers 12 having a hydroxyl group.

Examples of the polymerization initiator include, for example, 2,4,6-trimethylbenzoyl-diphenyl-phosphine oxide, bis(2,4,6-trimethylbenzoyl)-phenylphosphine oxide, 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 2-benzyl-2-dimethylamino-1-(4-morpholinophenyl)-butanone-1,2-(dimethylamino)-2-[(4-methylphenyl)methyl]-1-[4-(4-morpholinyl)phenyl]-1-butanone, and the like. One substance or a combination of two or more substances selected from the substances can be used.

Curable Component

The curable component is a component having a function of bonding particles by curing.

Examples of the curable component include, for example, thermoplastic resin; thermosetting resin; visible light curable resin cured by light in a visible light region, various kinds of photocurable resin, such as ultraviolet curable resin and an infrared curable resin; X ray curable resin; and the like and one curable component or a combination of two or more curable components selected from the curable components above can be used. Among the above, the curable component is preferably a curable resin from the viewpoints of the mechanical strength of the three-dimensionally shaped article to be obtained, the productivity of the three-dimensionally shaped article, and the like. Among the various kinds of curable resin, ultraviolet curable resin (polymerizable compound) is particularly preferable from the viewpoints of the mechanical strength of the three-dimensionally shaped article to be obtained, the productivity of the three-dimensionally shaped article, the storage stability of bonding liquid, the handling properties in an usual (visible light) environment, and the like.

As the ultraviolet curable resin (polymerizable compound), one is preferably used which starts addition polymerization or ring opening polymerization by radical species, cation species, and the like generated from a photopolymerization initiator by irradiation with ultraviolet rays to produce a polymer. As the polymerization manner of the addition polymerization, radical polymerization, cationic polymerization, anionic polymerization, metathesis polymerization, and coordination polymerization are mentioned. As the polymerization manner of the ring opening polymerization, cationic polymerization, anionic polymerization, radical polymerization, metathesis polymerization, and coordination polymerization are mentioned.

As an addition polymerizable compound, compounds having at least one ethylenically unsaturated double bond and the like are mentioned, for example. As the addition polymerizable compound, compounds having at least one terminal ethylenically unsaturated bond and preferably two or more ethylenically unsaturated bonds can be preferably used.

The ethylenically unsaturated polymerizable compounds have chemical forms of a monofunctional polymerizable compound and a polyfunctional polymerizable compound or a mixture thereof. Examples of the monofunctional polymerizable compound include, for example, unsaturated carboxylic acids (for example, acrylic acid, methacrylic acid, itaconic acid, crotonic acid, isocrotonic acid, maleic acid, and the like), esters thereof, amides thereof, and the like. As the polyfunctional polymerizable compound, esters of unsaturated carboxylic acids and aliphatic polyhydric alcohol compounds and amides of unsaturated carboxylic acids and aliphatic polyvalent amine compounds are used.

Moreover, addition reactants of unsaturated carboxylic acid esters or amides having nucleophilic substituents, such as a hydroxyl group, an amino group, and a mercapto group, with isocyanates and epoxies, dehydration condensation reactants with carboxylic acids, and the like can also be used. Moreover, addition reactants of unsaturated carboxylic acid esters or amides having electrophilic substituents, such as isocyanate groups and epoxy groups, with alcohols, amines, and thiols and further substitution reactants of unsaturated carboxylic acid esters or amides having leaving substituents, such as halogen groups and tosyloxy groups, with alcohols, amines, or thiols, can also be used.

As specific examples of the radically polymerizable compounds which are esters of unsaturated carboxylic acids and aliphatic polyhydric alcohol compounds, (meth)acrylic acid ester is a typical example, for example, and both a monofunctional type and a polyfunctional type can be used.

Specific examples of monofunctional(meth)acrylates include, for example, phenoxyethyl(meth)acrylate, phenyloxyethyl(meth)acrylate, cyclohexyl(meth)acrylate, ethyl(meth)acrylate, methyl(meth)acrylate, isobornyl(meth)acrylate, tetrahydrofurfuryl(meth)acrylate, 4-hydroxybutyl(meth)acrylate, 2-hydroxybutyl(meth)acrylate, and the like.

Specific examples of bifunctional (meth)acrylates include, for example, ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, hexanediol di(meth)acrylate, 1,4-cyclohexanediol di(meth)acrylate, tetraethylene glycol di(meth)acrylate, pentaerythritol di(meth)acrylate, dipentaerythritol di(meth)acrylate, (meth)acrylic acid-2-(2-vinyloxyethoxy)ethyl, dipropylene glycol diacrylate, tripropyrene glycol diacrylate, and the like.

Specific examples of trifunctional (meth)acrylates include, for example, trimethylolpropane tri(meth)acrylate, trimethylolethane tri(meth)acrylate, alkylene oxide-modified tri(meth)acrylate of trimethylolpropane, pentaerythritol tri(meth)acrylate, dipentaerythritol tri(meth)acrylate, trimethylolpropane tri((meth)acryloyloxypropyl)ether, isocyanuric acid alkylene oxide-modified tri(meth)acrylate, propionic acid dipentaerythritol tri(meth)acrylate, tri((meth)acryloyloxyethyl)isocyanurate, hydroxypivalaldehyde-modified dimethylolpropane tri(meth)acrylate, sorbitol tri(meth)acrylate, and the like.

Specific examples of tetrafunctional (meth)acrylates include, for example, pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate, and the like.

Specific examples of pentafunctional (meth)acrylates include, for example, sorbitol penta(meth)acrylate, dipentaerythritol penta(meth)acrylate, and the like.

Specific examples of hexafnctional (meth)acrylates include, for example, dipentaerythritol hexa(meth)acrylate, sorbitol hexa(meth)acrylate, alkylene oxide-modified hexa (meth)acrylate of phosphazene, captolactone-modified dipentaerythritol hexa(meth)acrylate, and the like.

Examples of polymerizable compounds other than the (meth)acrylates include, for example, itaconates, crotonates, isocrotonates, maleates, and the like.

Examples of itaconates include, for example, ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate, and the like.

Examples of crotonates include, for example, ethylene glycol dicrotonate, tetramethylene glycol dicrotonate, pentaerythritol dicrotonate, sorbitol tetradicrotonate, and the like.

Examples of isocrotonates include, for example, ethylene glycol diisocrotonate, pentaerythritol diisocrotonate, sorbitol tetraisocrotonate, and the like.

Examples of maleates include, for example, ethylene glycol dimaleate, triethylene glycol dimaleate, pentaerythritol dimaleate, sorbitol tetramaleate, and the like.

As examples of other esters, aliphatic alcohol esters described in JP-B-46-27926, JP-B-51-47334, and JP-A-57-196231, those having an aromatic skeleton described in JP-A-59-5240, JP-A-59-5241, and JP-A-2-226149, those containing amino groups described in JP-A-1-165613, and the like can also be used, for example.

Specific examples of monomers of amides of unsaturated carboxylic acids and aliphatic polyvalent amine compounds include, for example, methylenebis-acrylamide, methylenebis-methacrylamide, 1,6-hexamethylenebis-acrylamide, 1,6-hexamethylenebis-methacrylamide, diethylene diamine trisacrylamide, xylylenebis acrylamide, xylylenebis methacrylamide, and the like.

Examples of other preferable amide monomers include, for example, those having a cycloxylene structure described in JP-B-54-21726 and the like.

Moreover, urethane addition polymerizable compounds produced using an addition reaction of isocyanates and hydroxyl groups are also preferable. Specific examples of such compounds include, for example, vinyl urethane compounds containing two or more polymerizable vinyl groups in one molecule in which a vinyl monomer containing a hydroxyl group represented by the following formula (1) is added to a polyisocyanate compound having two or more isocyanate groups in one molecule described in JP-B-48-41708 and the like.

$$CH_2=C(R^1)COOCH_2CH(R^2)OH \quad (1)$$

(In Formula (1), $R^1$ and $R^2$ each independently represent H or $CH^3$).

In the present invention, cationic ring opening polymerizable compounds having one or more cyclic ether groups, such as epoxy groups and oxetane groups, in the molecules can be preferably used as an ultraviolet curable resin (polymerizable compound).

As cationically polymerizable compounds, curable compounds containing a ring opening polymerizable group are mentioned, for example, and, among the compounds, heterocyclic group containing curable compounds are particularly preferable. Examples of such curable compounds include, for example, cyclic iminoethers, such as epoxy derivatives, oxetane derivatives, tetrahydrofuran derivatives, cyclic lactone derivative, cyclic carbonate derivatives, and oxazoline derivatives, and vinyl ethers. Among the above, epoxy derivatives, oxetane derivatives, and vinyl ethers are preferable.

Examples of preferable epoxy derivatives include, for example, monofunctional glycidyl ethers, polyfunctional glycidyl ethers, monofunctional alicyclic epoxies, polyfunctional alicyclic epoxies, and the like.

Examples of specific compounds of glycidyl ethers include, for example, diglycidyl ethers (for example, ethylene glycol diglycidyl ether, bisphenol A diglycidyl ether, and the like), trifunctional or higher glycidyl ethers (for example, trimethylolethane triglycidyl ether, trimethylolpropane triglycidyl ether, glycerol triglycidyl ether, triglycidyl trishydroxyethyl isocyanurate, and the like), tetrafunctional or higher glycidyl ethers (for example, sorbitol tetraglycidyl ether, pentaerythritol tetraglycylether, polyglycidyl ether of cresol novolac resin, polyglycidyl ether of phenol novolac resin, and the like), alicyclic epoxies (for example, CELLOXIDE 2021P, CELLOXIDE 2081, EPOLEAD GT-301, and EPOLEAD GT-401 (all manufactured by Daicel Chemical Industries), EHPE (manufactured by Daicel Chemical Industries), polycyclohexylepoxy methylether of phenol novolac resin, and the like), oxetanes (for example, OX-SQ and PNOX-1009 (all manufactured by Toagosei Co., Ltd.) and the like), and the like.

As the polymerizable compound, alicyclic epoxy derivatives can be preferably used. The "alicyclic epoxy group" refers to a partial structure in which a double bond of the cycloalkene ring of a cyclopentene group, a cyclohexene group, and the like is epoxidized with a proper oxidizer, such as hydrogen peroxide and peracid.

As alicyclic epoxy compounds, polyfunctional alicyclic epoxies having two or more cyclohexene oxide groups or cyclopentene oxide groups in one molecule are preferable. Specific examples of the alicyclic epoxy compounds include, for example, 4-vinylcyclohexene dioxide, (3,4-epoxycyclohexyl)methyl-3,4-epoxycyclohexyl carboxylate, di(3,4-epoxycyclohexyl)adipate, di(3,4-epoxy cyclohexylmethyl)adipate, bis(2,3-epoxycyclopentyl)ether, di(2,3-epoxy-6-methylcyclohexylmethyl)adipate, dicyclopentadiene dioxide, and the like.

Glycidyl compounds having usual epoxy groups and not having the alicyclic structure in the molecules can also be used alone or can also be used in combination with the alicyclic epoxy compounds mentioned above.

As such usual glycidyl compounds, glycidyl ether compounds, glycidyl ester compounds, and the like can be mentioned, for example, and it is preferable to use the glycidyl ether compounds in combination.

Specific examples of the glycidyl ether compounds include, for example, aromatic glycidyl ether compounds, such as 1,3-bis(2,3-epoxypropyloxy)benzene, bisphenol A type epoxy resin, bisphenol F type epoxy resin, phenol.novolac type epoxy resin, cresol.novolac type epoxy resin, and trisphenol methane epoxy resin, aliphatic glycidyl ether compounds, such as 1,4-butanediol glycidyl ether, glycerol triglycidyl ether, propyleneglycol diglycidyl ether, and trimethylolpropane triglycidyl ether, and the like. As glycidyl ester, glycidyl ester of a linolenic acid dimer and the like can be mentioned, for example.

As the polymerizable compound, compounds having an oxetanyl group which is a four-membered ring cyclic ether (hereinafter simply referred to as an "oxetane compound") can be used. The oxetanyl group containing compound is a compound having one or more oxetanyl groups in one molecule.

The content of the curable component in the ink 2 is preferably 80 mass % or more and more preferably 85 mass % or more. Thus, the mechanical strength of the three-dimensionally shaped article 100 to be finally obtained by this can be made particularly excellent.

Other Components

Moreover, the ink 2 may contain components other than the components mentioned above. Examples of such components include, for example, various colorants, such as pigments and dyes; dispersants; surfactants; polymerization initiators; polymerization accelerators; solvents; penetration accelerators; wetting agents (moisturizers); fixing agents; antifungal agents; antiseptics; antioxidants; ultraviolet absorbers; chelating agents; pH adjusters; thickening agents; filler; aggregation prevention agents; antifoaming agents; and the like.

In particular, due to the fact that the ink 2 contains a colorant, the three-dimensionally shaped article 100 colored into a color corresponding to the color of the colorant can be obtained.

In particular, by blending pigments as the colorant, the lightfastness of the ink 2 and the three-dimensionally shaped article 100 can be made good. As the pigments, both inorganic pigments and organic pigments can be used.

Examples of the inorganic pigments include, for example, carbon black (C. I. Pigment black 7), such as furnace black, lamp black, acetylene black, and channel black, iron oxide, titanium oxide, and the like and one pigment or a combination of two or more pigments selected from the pigments above can be used.

Among the inorganic pigments, titanium oxide is preferable in order to exhibit preferable white color.

Examples of the organic pigments include, for example, azo pigments, such as insoluble azo pigments, condensed azo pigments, azo lakes, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelate, acid dye type chelate, and the like), dye lakes (basic dye type lake and acid dye type lake), nitro pigment, nitroso pigment, aniline black, daylight fluorescent pigment, and the like and one pigment or a combination of two or more pigments selected from the pigments above can be used.

When the ink 2 contains the pigment, the average particle diameter of the pigment is preferably 300 nm or less and more preferably 50 nm or more and 250 nm or less. Thus, the discharge stability of the ink 2 and the dispersion stability of the pigment in the ink 2 can be made particularly excellent and also images with more excellent image quality can be formed.

Examples of the dyes include, for example, acid dyes, direct dyes, reactive dyes, basic stains, and the like and one dye or a combination of two or more dyes selected from the dyes above can be used.

When the ink 2 contains the colorant, the content of the colorant in the ink 2 is preferably 1 mass % or more and 20 mass % or less. Thus, particularly excellent concealability and color reproducibility are obtained.

In particular, when the ink 2 contains titanium oxide as the colorant, the content of the titanium oxide in the ink 2 is preferably 12 mass % or more and 18 mass % or less and more preferably 14 mass % or more and 16 mass % or less. Thus, particularly excellent concealability is obtained.

When the ink 2 contains the pigment and further contains a dispersant, the dispersibility of the pigment can be made better. As a result, a partial reduction in the mechanical strength due to pigment unevenness can be more effectively suppressed.

The dispersant is not particularly limited and dispersants commonly used for preparing a pigment dispersion liquid, such as polymer dispersants, are mentioned, for example. Specific examples of the polymer dispersants include, for example, those containing, as the main component, one or more kinds of polyoxyalkylene polyalkylene polyamine, vinyl polymers and copolymers, acrylic polymers and copolymers, polyesters, polyamides, polyimides, polyurethanes, amino polymers, silicon containing polymers, sulfur containing polymers, fluorine containing polymers, and epoxy resin, and the like. Examples of commercially-available items of the polymer dispersants include Ajisper series manufactured by Ajinomoto Fine-Techno Co., Inc., Solsperse series (Solsperse 36000 and the like) available from Noveon, DISPERBYK series manufactured by BYK, Disparlon series manufactured by Kusumoto Chemicals, Ltd., and the like.

When the ink 2 contains the surfactant, the abrasion resistance of the three-dimensionally shaped article 100 can be made better. The surfactant is not particularly limited and, for example, polyester-modified silicone, polyether-modified silicone, and the like as silicone surfactants can be used. Among the above, it is preferable to use polyether-modified polydimethyl siloxane or polyester-modified polydimethyl siloxane. Specific examples of the surfactants include, for example, BYK-347, BYK-348, BYK-UV3500, 3510, 3530, and 3570 (Trade name, all manufactured by BYK), and the like.

The ink 2 may contain a solvent. Thus, the viscosity of the ink 2 can be suitably adjusted. Even when the ink 2 contains a high viscosity component, the discharge stability of the ink 2 by an ink jet system can be made particularly excellent.

Examples of the solvents include, for example, (poly) alkylene glycol monoalkyl ethers, such as ethylene glycol monomethyl ether, ethylene glycol monoethyl ether, propylene glycol monomethyl ether, and propylene glycol monoethyl ether; acetate esters, such as ethyl acetate, n-propyl acetate, iso-propyl acetate, n-butyl acetate, and iso-butyl acetate; aromatic hydrocarbons, such as benzene, toluene, and xylene; ketones, such as methyl ethyl ketone, acetone, methyl isobutyl ketone, ethyl-n-butyl ketone, diisopropyl ketone, and acetyl acetone; alcohols, such as ethanol, propanol, and butanol, and one solvent or a combination of two or more solvents selected from the substances above can be used.

The viscosity of the ink 2 is preferably 10 mPa·s or more and 25 mPa·s or less and more preferably 15 mPa·s or more and 20 mPa·s or less. Thus, the discharge stability by an ink jet method of the ink can be made particularly excellent. In this specification, the viscosity refers to a value measured at 25° C. using an E type viscometer (VISCONIC ELD manufactured by Tokyo Keiki Co., Ltd.).

For the production of the three-dimensionally shaped article 100, two or more kinds of the ink 2 may be used.

For example, an ink 2 (color ink) containing a colorant and an ink 2 (clear ink) not containing a colorant may be used. Thus, the ink 2 containing a colorant may be used as the ink 2 to be given to a region which affects the color tone in appearance of the three-dimensionally shaped article 100 and the ink 2 not containing a colorant may be used as the ink 2 to be given to a region which does not affect the color tone in appearance of the three-dimensionally shaped article 100, for example. In the three-dimensionally shaped article 100 to be finally obtained, two or more kinds of the ink 2 may be used in combination in such a manner that a region (coat layer) is formed using the ink 2 not containing a colorant on the outer surface of a region formed using the ink 2 containing a colorant.

Two or more kinds of the ink 2 containing colorants of different compositions may be used, for example. Thus, the color reproduction area which can be expressed can be enlarged by combining the two or more kinds of the ink 2.

When using two or more kinds of the ink 2, it is preferable to at least use the ink 2 of a cyan color, the ink 2 of a magenta color, and the ink 2 of a yellow color. Thus, the color reproduction area which can be expressed can be enlarged by combining the two or more kinds of the ink 2.

By the use of the ink 2 of a white color in combination with the ink 2 of another color, the following effects are obtained, for example. More specifically, the three-dimensionally shaped article 100 to be finally obtained can be provided with a first region to which the white ink 2 is given and a region to which the colored ink 2 of the color other than the white color and which is overlapped with the first region and provided on the outer surface side relative to the first region. Thus, the first region to which the white ink 2 is given can demonstrate concealability, so that the chromaticness of the three-dimensionally shaped article 100 can be increased.

4. Three-Dimensional Shaping Material Set

A three-dimensional shaping material set contains the above-described three-dimensional shaping composition containing particles having a hydrophilic surface and water-soluble monomers having a hydroxyl group and the above-described ink.

By the use of such a three-dimensional shaping material set, the three-dimensionally shaped article excellent in mechanical strength can be efficiently produced.

5. Three-Dimensionally Shaped Article

The three-dimensionally shaped article of the present invention is produced using the method for producing a three-dimensionally shaped article described above. Thus, the three-dimensionally shaped article excellent in mechanical strength can be provided.

The use of the three-dimensionally shaped article of the present invention is not particularly limited and ornamental objects/exhibits, such as dolls and figures, medical devices, such as implants, and the like are mentioned, for example.

The three-dimensionally shaped article of the present invention may be applied to all of prototypes, mass-produced articles, and custom-made articles.

As described above, the preferable embodiments of the present invention are described but the present invention is not limited thereto.

More specifically, in the embodiments described above, a description is given based on the fact that, in addition to the layer formation process and the ink discharge process, the curing process is also repeatedly performed together with the layer formation process and the ink discharge process, for example, but the curing process may not be repeatedly performed. For example, after forming a laminate having a plurality of non-cured layers, the curing process may be performed at one time.

In the production method of the present invention, a pretreatment process, an intermediate treatment process, and a post-treatment process may be performed as necessary.

As the pretreatment process, a cleaning process of a support (stage) and the like are mentioned, for example.

As the intermediate treatment process, when the three-dimensional shaping composition contains a solvent component (dispersion medium), such as water, a solvent component removal process of removing the solvent component may be provided between the layer formation process and the ink discharge process, for example. Thus, the layer formation process can be more smoothly performed and undesired variation in the thickness of layers to be formed can be more effectively prevented. As a result, a three-dimensionally shaped article with higher dimensional accuracy can be produced with higher productivity.

Examples of the post treatment process include, for example, a cleaning process, a shape adjustment process of removing burrs, a coloring process, a coat layer formation process, a process of completing curing of curable component of performing light irradiation processing and heat treatment processing for certainly curing an uncured curable component, and the like.

In the embodiments described above, a description is given based on the fact that ink is given to all the layers but a layer to which ink is not given may be provided. For example, a layer formed immediately on a support (stage) may function as a sacrifice layer, without giving ink to the layer.

In the embodiment described above, a description is described mainly based on the case where the ink discharge process is performed by an ink jet method but the ink discharge process may be performed using other methods (for example, other printing methods).

EXAMPLES

Hereinafter, the present invention is described in more detail with reference to specific Examples but the present invention is not limited only to Examples. In the following description, processing whose temperature conditions are not particularly specified was performed at room temperature (25° C.). With respect to various measurement conditions whose temperature conditions are not particularly specified, numerical values at room temperature (25° C.) are shown.

[1] Production of Three-Dimensionally Shaped Article

Example 1

1. Preparation of Three-Dimensional Shaping Composition

First, powder containing porous silica particles having a large number of hydroxyl groups on the surface (Silica particles generated by a precipitation method: Average particle diameter of 2.6 μm) was prepared.

Next, powder: 26 pts·mass, water: 50 pts·mass, and 4-hydroxybutyl acrylate as water-soluble monomers having a hydroxyl group: 24 pts·mass were mixed to give a three-dimensional shaping composition.

2. Production of Three-Dimensionally Shaped Article

Figure 3:
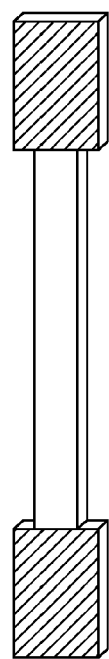
FIG. 3 is a perspective view illustrating the shape of a three-dimensionally shaped article (three-dimensionally shaped article A) to be produced in each Example and each Comparative Example.
Figure 4:
FIG. 4 is a perspective view illustrating the shape of a three-dimensionally shaped article (three-dimensionally shaped article B) to be produced in each Example and each Comparative Example.

Using the obtained three-dimensional shaping composition, a three-dimensionally shaped article A of a shape as illustrated in FIG. 3, i.e., Thickness: 4 mm×Length: 150 mm; Width of regions indicated with hatched line portions provided on both ends (Upper side and Lower side of FIG. 3): 20 mm and Length: 35 mm; Width of a region sandwiched by the regions: 10 mm and Length: 80 mm; and a three-dimensionally shaped article B of a shape illustrated in FIG. 4, i.e., a cube shape of Thickness: 4 mm×Width: 10 mm×Length: 80 mm, were produced as follows.

First, a three-dimensional shaping apparatus was prepared, and then a layer of thickness: 100 μm was formed by a squeegee method on the surface of a support (stage) using the three-dimensional shaping composition (Layer formation process).

Next, after the layer formation, water contained in the three-dimensional shaping composition was removed by leaving the support with the layer as it was for 1 minute at room temperature.

Next, ink was given to the layer containing the three-dimensional shaping composition with a predetermined pattern by an ink jet method (Ink discharge process). As the ink, an ink having the following composition and having a viscosity at 25° C. of 22 mPa·s was used.
Ultraviolet Curable Resin
  4-hydroxybutyl acrylate: 90.75 mass %
Polymerization initiator
  bis(2,4,6-trimethylbenzoyl)-phenylphosphine oxide: 5 mass %
  2,4,6-trimethylbenzoyl-diphenyl-phosphine oxide: 4 mass %
Fluorescent Brightening Agent (Sensitizer)
  1,4-bis-(benzoxazolyl-2-yl) naphthalene: 0.25 mass %

Next, the layer was irradiated with ultraviolet rays to cure the ultraviolet curable resin contained in the three-dimensional shaping composition (Curing process).

Thereafter, the series of the processes of the layer formation process and the curing process were repeatedly performed in such a manner that a plurality of layers are laminated while changing the ink giving pattern according to the shape of the three-dimensionally shaped article to be produced.

Next, the obtained entire laminate was heated at 60° C. for 100 minutes (Heating process).

Thereafter, the laminate obtained as described above was dipped in water, and then ultrasonic vibration was given thereto to thereby remove particles which are not bonded (unbonded particles) by the ultraviolet curable resin among the particles constituting each layer, whereby two three-dimensionally shaped articles A and two three-dimensionally shaped articles B were obtained.

Then, drying processing was performed under the conditions of 60° C.×20 minutes.

Examples 2 to 5

Three-dimensionally shaped articles were produced in the same manner as in Example 1 described above, except changing the type of raw materials to be used for preparing a three-dimensional shaping composition and the compounding ratio of each component to thereby change the configuration of the three-dimensional shaping compositions as shown in Table 1 and using ink shown in Table 2 as the ink.

Example 6

A three-dimensionally shaped article was produced in the same manner as in Example 1 described above, except changing the type of raw materials to be used for preparing a three-dimensional shaping composition and the compounding ratio of each component to thereby change the configuration of the three-dimensional shaping composition as shown in Table 1 and using ink having the following composition as the ink.
Polymerization Initiator
   bis(2,4,6-trimethylbenzoyl)-phenyl phosphine oxide: 5.5 mass %
Solvent
   Butyl acetate: 94.5 mass %

Example 7

A three-dimensionally shaped article was produced in the same manner as in Example 1 described above, except changing the type of raw materials to be used for preparing a three-dimensional shaping composition and the compounding ratio of each component to thereby change the configuration of the three-dimensional shaping composition as shown in Table 1 and using ink having the following composition as the ink.
Polymerization Initiator
   2,4,6-trimethylbenzoyl-diphenyl-phosphine oxide: 10.0 mass %
Solvent
   Butyl acetate: 90.0 mass %

Comparative Example 1

A three-dimensionally shaped article was produced in the same manner as in Example 1 described above, except changing the type of raw materials to be used for preparing a three-dimensional shaping composition, which is not hydrophilic, and the compounding ratio of each component to thereby change the configuration of the three-dimensional shaping composition as shown in Table 1.

Comparative Example 2

A three-dimensionally shaped article was produced in the same manner as in Example 1 described above, except changing the type of raw materials to be used for preparing a three-dimensional shaping composition and the compounding ratio of each component to thereby change the configuration of the three-dimensional shaping composition as shown in Table 1 and using phenoxy ethyl acrylate as an ultraviolet curable resin to be contained in ink.

The configurations of the three-dimensional shaping compositions of each Example and each Comparative Example are collectively shown in Table 1 and the configuration of each ink is collectively shown in Table 2. In Tables 1 and 2, silica was indicated as "$SiO_2$", alumina was indicated as "$Al_2O_3$", titanium oxide was indicated as "$TiO_2$", calcium carbonate was indicated as "$CaCO_3$", polyethylene was indicated as "PE", polypropylene was indicated as "PP", a hydroxyl group was indicated as "OH", a carboxyl group was indicated as "COOH", an amino group was indicated as "$NH_2$", 4-hydroxybutyl acrylate was indicated as "4HB", 2-hydroxybutyl acrylate was indicated as "2HB", and phenol epoxy acrylate was indicated as "EPA".

The carboxyl group into the particle surface was introduced by surface treating the calcium carbonate particle surface with 3-trimethoxysilylpropyl succinic acid anhydride.

The amino group into the particle surface was introduced by surface treating silica particle surface with 3-aminopropyl triethoxy silane.

In Examples 2 to 7 and Comparative Examples 1 to 2, particles in which no voids were formed, so-called solid particles, were used as the particles of the three-dimensional shaping composition.

TABLE 1

| | Three-dimensional shaping composition | | | | | | |
|---|---|---|---|---|---|---|---|
| | Particles | | | | Water-soluble monomer | | Water |
| | Type | Type of functional group on surface | Surface properties | Content [mass %] | Type | Content [mass %] | Content [mass %] |
| Ex. 1 | $SiO_2$ | OH | Hydrophilic | 68.0 | 4HB | 9.0 | 23.0 |
| Ex. 2 | $Al_2O_3$ | OH | Hydrophilic | 68.0 | AM | 9.0 | 23.0 |
| Ex. 3 | $TiO_2$ | OH | Hydrophilic | 68.0 | EPA | 9.0 | 23.0 |
| Ex. 4 | $CaCO_3$ | COOH | Hydrophilic | 68.0 | AM | 9.0 | 23.0 |
| Ex. 5 | $SiO_2$ | $NH_2$ | Hydrophilic | 68.0 | 4HB | 9.0 | 23.0 |
| Ex. 6 | $SiO_2$ | OH | Hydrophilic | 68.0 | 4HB | 9.0 | 23.0 |
| Ex. 7 | $SiO_2$ | OH | Hydrophilic | 68.0 | 4HB | 9.0 | 23.0 |
| Comp. Ex. 1 | PE | — | Hydrophobic | 68.0 | 4HB | 9.0 | 23.0 |
| Comp. Ex. 2 | $SiO_2$ | OH | Hydrophilic | 68.0 | — | — | 32.0 |

TABLE 2

| | Curable ink | | | |
|---|---|---|---|---|
| | Ultraviolet curable resin Content [mass %] | Polymerization initiator Content [mass %] | Sensitizer Content [mass %] | Solvent Content [mass %] |
| Ex. 1 | 90.75 | 9.00 | 0.25 | — |
| Ex. 2 | 90.75 | 9.00 | 0.25 | — |
| Ex. 3 | 90.75 | 9.00 | 0.25 | — |
| Ex. 4 | 90.75 | 9.00 | 0.25 | — |
| Ex. 5 | 90.75 | 9.00 | 0.25 | — |
| Ex. 6 | — | 5.5 | — | 94.5 |
| Ex. 7 | — | 10.0 | — | 90.0 |
| Comp. Ex. 1 | 90.75 | 9.00 | 0.25 | — |
| Comp. Ex. 2 | 90.75 | 9.00 | 0.25 | — |

[3] Evaluation

[3.1] Tensile Strength and Tensile Elastic Modulus

The three-dimensionally shaped articles A of each Example and each Comparative Example were measured under the conditions of Tensile yield stress: 50 mm/min and Tensile elastic modulus: 1 mm/min based on JIS K 7161:1994 (ISO 527:1993) to be evaluated for the tensile strength and the tensile elastic modulus in accordance with the following criteria.

Tensile Strength
A: Tensile strength is 35 MPa or more.
B: Tensile strength is 30 MPa or more and less than 35 MPa.
C: Tensile strength is 20 MPa or more and less than 30 MPa.
D: Tensile strength is 10 MPa or more and less than 20 MPa.
E: Tensile strength is less than 10 MPa.

Tensile Elastic Modulus
A: Tensile elastic modulus is 1.5 GPa or more.
B: Tensile elastic modulus is 1.3 GPa or more and less than 1.5 GPa.
C: Tensile elastic modulus is 1.1 GPa or more and less than 1.3 GPa.
D: Tensile elastic modulus is 0.9 GPa or more and less than 1.1 GPa.
E: Tensile elastic modulus is less than 0.9 GPa.

[3.2] Bending Strength and Bending Elastic Modulus

The three-dimensionally shaped articles B of each Example and each Comparative Example were measured under the conditions of Distance between support points: 64 mm and Test speed: 2 mm/min based on JIS K 7171:1994 (ISO 178:1993) to be evaluated for the bending strength and the bending elastic modulus in accordance with the following criteria.

Bending Strength
A: Bending strength is 65 MPa or more.
B: Bending strength is 60 MPa or more and less than 65 MPa.
C: Bending strength is 45 MPa or more and 60 MPa.
D: Bending strength is 30 MPa or more and 45 MPa.
E: Bending strength is less than 30 MPa.

Bending Elastic Modulus
A: Bending elastic modulus is 2.4 GPa or more.
B: Bending elastic modulus is 2.3 GPa or more and less than 2.4 GPa.
C: Bending elastic modulus is 2.2 GPa or more and less than 2.3 GPa.
D: Bending elastic modulus is 2.1 GPa or more and less than 2.2 GPa.
E: Bending elastic modulus is less than 2.1 GPa.

These results are collectively shown in Table 3.

TABLE 3

| | Tensile strength | Tensile elastic modulus | Bending strength | Bending elastic modulus |
|---|---|---|---|---|
| Ex. 1 | A | A | A | A |
| Ex. 2 | A | A | A | A |
| Ex. 3 | A | A | A | A |
| Ex. 4 | A | A | A | A |
| Ex. 5 | A | A | A | A |
| Ex. 6 | A | A | A | A |
| Ex. 7 | A | A | A | A |
| Comp. Ex. 1 | E | E | E | E |
| Comp. Ex. 2 | D | D | D | D |

As is clear from Table 3, in the present invention, the three-dimensionally shaped article excellent in mechanical strength was able to be obtained. On the other hand, sufficient results were not able to be obtained in Comparative Examples.

The entire disclosure of Japanese Patent Application No. 2014-213613, filed Oct. 20, 2014 is expressly incorporated by reference herein.

What is claimed is:

1. A three-dimensional shaping composition, which is used for producing a three-dimensionally shaped article by laminating layers and discharging an ink containing a polymerization initiator to the layers, the three-dimensional shaping composition comprising:
    particles having a hydrophilic surface; and
    water-soluble monomers having a hydroxyl group,
    wherein the water-soluble monomer is at least one selected from the group consisting of 4-hydroxybutyl acrylate, 2-hydroxybutyl acrylate, and phenol epoxy acrylate.

2. The three-dimensional shaping composition according to claim 1, wherein the water-soluble monomer is a radically polymerizable monomer or a cationically polymerizable monomer.

3. The three-dimensional shaping composition according to claim 1, further comprising an aqueous solvent.

4. The three-dimensional shaping composition according to claim 1, wherein the particles have at least one functional group selected from the group consisting of a hydroxyl group, a carboxyl group, and an amino group on the surface.

5. The three-dimensional shaping composition according to claim 1, wherein a constituent material of the particles is at least one selected from the group consisting of silica, calcium carbonate, alumina, and titanium oxide.

* * * * *